United States Patent
George et al.

(10) Patent No.: US 9,152,529 B2
(45) Date of Patent: Oct. 6, 2015

(54) SYSTEMS AND METHODS FOR DYNAMICALLY ALTERING A USER INTERFACE BASED ON USER INTERFACE ACTIONS

(71) Applicants: William Brandon George, Pleasant Grove, UT (US); Kevin G. Smith, Lehi, UT (US); Edward L. Hewett, Crockett, TX (US)

(72) Inventors: William Brandon George, Pleasant Grove, UT (US); Kevin G. Smith, Lehi, UT (US); Edward L. Hewett, Crockett, TX (US)

(73) Assignee: Adobe Systems Incorporated, San Jose, CA (US)

( * ) Notice: Subject to any disclaimer, the term of this patent is extended or adjusted under 35 U.S.C. 154(b) by 194 days.

(21) Appl. No.: 13/625,792

(22) Filed: Sep. 24, 2012

(65) Prior Publication Data

US 2014/0089824 A1 Mar. 27, 2014

(51) Int. Cl.
| | |
|---|---|
| *G06F 3/01* | (2006.01) |
| *G06F 11/34* | (2006.01) |
| *G06F 3/0481* | (2013.01) |
| *G06F 9/44* | (2006.01) |
| *G06F 9/445* | (2006.01) |

(52) U.S. Cl.
CPC .......... *G06F 11/3438* (2013.01); *G06F 3/0481* (2013.01); *G06F 8/38* (2013.01); *G06F 9/4451* (2013.01); *G06F 2201/81* (2013.01); *G06F 2201/865* (2013.01)

(58) Field of Classification Search
CPC .................................................. G06F 3/0481
USPC ....................................................... 715/762
See application file for complete search history.

(56) References Cited

U.S. PATENT DOCUMENTS

| | | | |
|---|---|---|---|
| 6,397,256 B1 | 5/2002 | Chan et al. | |
| 7,644,375 B1 | 1/2010 | Anderson et al. | |
| 7,886,202 B2 | 2/2011 | Lin et al. | |
| 7,911,626 B2 | 3/2011 | Ferlitsch | |
| 8,006,187 B1 | 8/2011 | Bailey | |
| 8,924,942 B1* | 12/2014 | Makuch et al. | 717/131 |
| 2002/0087289 A1* | 7/2002 | Halabieh | 702/181 |
| 2005/0278630 A1 | 12/2005 | Bracey | |
| 2006/0031465 A1* | 2/2006 | Ahya et al. | 709/224 |
| 2008/0004937 A1 | 1/2008 | Chow et al. | |
| 2008/0222618 A1 | 9/2008 | Valtchev | |
| 2010/0229194 A1* | 9/2010 | Blanchard et al. | 725/39 |
| 2011/0124409 A1* | 5/2011 | Baynes et al. | 463/30 |
| 2011/0202864 A1* | 8/2011 | Hirsch et al. | 715/773 |
| 2011/0302513 A1 | 12/2011 | Ademar et al. | |

(Continued)

OTHER PUBLICATIONS

U.S. Appl. No. 13/335,648, filed Dec. 22, 2011, William Brandon George Et al.

(Continued)

*Primary Examiner* — William Bashore
*Assistant Examiner* — Daniel Rodriguez
(74) *Attorney, Agent, or Firm* — Kilpatrick Townsend & Stockton LLP (57) ABSTRACT

A plurality of user interface (UI) actions from a particular user is detected via a user interface of the application. The plurality of UI actions is analyzed to determine a usage pattern for the particular user. A modification to the user interface is determined based on the determined usage pattern. The determined modification in the user interface is implemented to customize the user interface of the application for the particular user. The determined modification may be stored in a user profile for subsequent use.

22 Claims, 7 Drawing Sheets

(56) References Cited

U.S. PATENT DOCUMENTS

2012/0102304 A1* 4/2012 Brave .............................. 713/1
2013/0111586 A1* 5/2013 Jackson ......................... 726/23
2013/0346917 A1* 12/2013 Bragdon et al. ............. 715/802

OTHER PUBLICATIONS

U.S. Appl. No. 13/408,961, filed Feb. 29, 2012, William Brandon George Et al.

* cited by examiner

| Usage Pattern | Modification |
|---|---|
| Cntrl-Z keystroke | Create larger viewing area by removing undo from toolbar |
| Display angle tilted | Adjust font size to optimize display of content |
| Novice user | Present help tutorial to user |
| Increases font | Set increased font size as the default |
| Scrolls with mouse/scroll bars | Disable trackpad to avoid accidental scrolling |
| Scrolls with mouse wheel | Create larger viewing are by removing scroll bars |
| Slow swiper | Increase scroll speed ratio |
| First reader | Display navigational prompts introducing reader to content |
| Zoom in | Set zoom setting as default |
| User 1 | Access user 1 profile |
| Lock content | Scroll content based on movement |
| ... | ... |

SYSTEMS AND METHODS FOR DYNAMICALLY ALTERING A USER INTERFACE BASED ON USER INTERFACE ACTIONS

BACKGROUND

Computing devices have become widely available in recent years. Examples of computing devices are desktop computers, laptops, tablets, and smart phones. Typically a wide variety of software and/or applications is implemented on the computing devices. The software and/or applications may be word processing, mail tools, image processing tools, games, and/or web-based browsers. The computing devices may implement a user interface to facilitate user interaction with the applications implemented on the computing device. The user interface may accept mouse operations, touch screen operations, accelerometer changes and/or keystrokes to initiate an event in the software or application on a computing device. For example, a smart phone may accept touch screen operations to activate a feature of an application, select an object and/or enter data within the application. As another example, in a web-based browser executing on a tablet or desktop computing device, a user interface may accept mouse operations or touch screen operations in the application to select an item for purchase, zoom in for a closer view, select features of the item (e.g., color) and put the item in a shopping cart. As another example, a mouse click or a keystroke may be used on a laptop to select a menu option of an image processing application. As another example, screen touches, keystrokes and/or mouse clicks may be used to select features such as font size, a scroll bar setting and/or other configuration of a browser window.

Users of an application may interact with the application in ways described above (e.g., mouse clicks, etc.). A user may interact with the application in many combinations of user interface actions within the same session of the application. During a session of the application a user may interact with a given feature in a particular manner. For example, a user may always used keystrokes to invoke commands instead of selecting the command in a tool bar via a mouse. The toolbar utilizes valuable area in the view window of an application. As another example, a user may be very familiar with an application in certain areas but inexperienced with certain features of an application. Without guidance of a tutorial or pop-ups with feature explanations, the user may become frustrated with the application. The overall user experience may be degraded.

SUMMARY

Various embodiments of methods and systems for dynamically altering a user interface are presented. In some embodiments, a method for detecting a plurality of user interface (UI) actions from a particular user via a user interface of the application is implemented. In some embodiments, the plurality of UI actions is analyzed to determine a usage pattern for the particular user. In some embodiments, a modification to the user interface is determined based on the determined usage pattern. In some embodiments, the determined modification is implemented in the user interface to customize the user interface of the application for the particular user. In some embodiments, an indication of the determined usage pattern is stored in a user profile for the particular user.

In some embodiments, analyzing the plurality of UI actions to determine a usage pattern for the particular user include parsing the plurality of UI actions into one or more sequences of UI actions. In some embodiments, a match is determined between at least one of the one or more sequences of UI actions and at least one of one or more pre-determined usage patterns. In some embodiments, determining a match comprises tracking repeat occurrences of a particular sequence of UI actions. In some embodiments, in response to determining that a number of occurrences of the particular sequence of UI actions meet a pre-determined threshold, determining the particular pattern is a match. In some embodiments, a modification corresponding to the determined usage pattern is selected from a pre-determined store of modifications linked to usage patterns.

In some embodiments, the plurality of UI actions is analyzed to determine an identity for the particular user. In some embodiments, a user profile for the particular user is accessed based on the determined identity. In some embodiments the user interface for the particular user is customized according to previously determined usage pattern based modification as indicated in the user profile for the particular user.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, provided in some embodiments are systems and methods for dynamically altering a user interface based on user interface actions. In some embodiments, a plurality of user interface (UI) actions from a particular user is detected via the user interface of the application. A modification to the user interface is determined based on the determined usage pattern. The determined modification in the user interface is implemented to customize the user interface of the application for the particular user. The determined usage pattern for the particular user may be stored in a user profile. In some embodiments, the analyzing the plurality of UI actions to determine a user pattern includes parsing the plurality of UI actions into one or more sequence of UI actions. In some embodiments, a match between a sequence of UI actions and at least one of one or more pre-determined usage patterns is determined. A match is determined via tracking repeat occurrences of a particular sequence of UI actions. In response to determine that a number of occurrences of the particular sequence of UI actions meets a pre-determined threshold, a match is determined. Based on this match, a modification corresponding to the particular sequence of UI actions is selected and implemented in the user interface for a particular user.

For example, in some embodiments, a user of an image processing application on a laptop may use a given feature. Although the user is familiar with the application, the feature may be new for the user and the user may have difficulty with the feature as indicated by frequent selection of the undo feature, long lapses of time between selecting various aspects of the feature and/or accessing a help search window. Unknown to the user, though, user interface (UI) actions are detected during use of the application by a given user. Based on the sequence of UI actions and the count for the particular sequence of UI actions, a usage pattern is determined and a modification to the user interface may be determined and automatically implemented. For example, the modification may invoke pop-up windows with tips for using the feature. As another example, the modification may invoke a help feature that walks the user through the feature step by step.

In another example embodiment, during a session of an "app" (e.g., literature reading, gaming, or other entertainment application), the user of the "app" may frequently place the tablet on a stable surface versus holding it at a given angle. Based on detecting this user interface (UI) action multiple times for a given user, a modification may be automatically implemented to adjust aspect ratios and/or font size in the viewing area of the "app" to optimize the user experience for the given user. This modification may be stored in a user profile and implemented in subsequent uses of the "app"

In another example embodiment, a mobile device or tablet user may frequently use swipe instead of utilizing the scroll bars. In response to detecting this UI action (e.g., swipe) multiple times, a modification to remove the scroll bars from the view of the application may be automatically implemented for the given user. The removing the scroll bar modification may be stored in a user profile and implemented to customize the user interface for the given user in subsequent uses of the mobile device or tablet.

In another example embodiment, a user of an application (e.g., image processing tool) may frequently reconfigure the tool bars to include the advanced and/or expert options for various features of the application. Based on UI actions detected from the feature selections and the frequent occurrence, a modification to always present the advanced and/or expert options of any features in the application may be automatically implemented for the given user. The users preference (e.g., as indicated by the UI actions) for selecting the expert features is stored in a user profile an implemented to customize the user interface for the given user in subsequent uses of the application.

Figure 1:
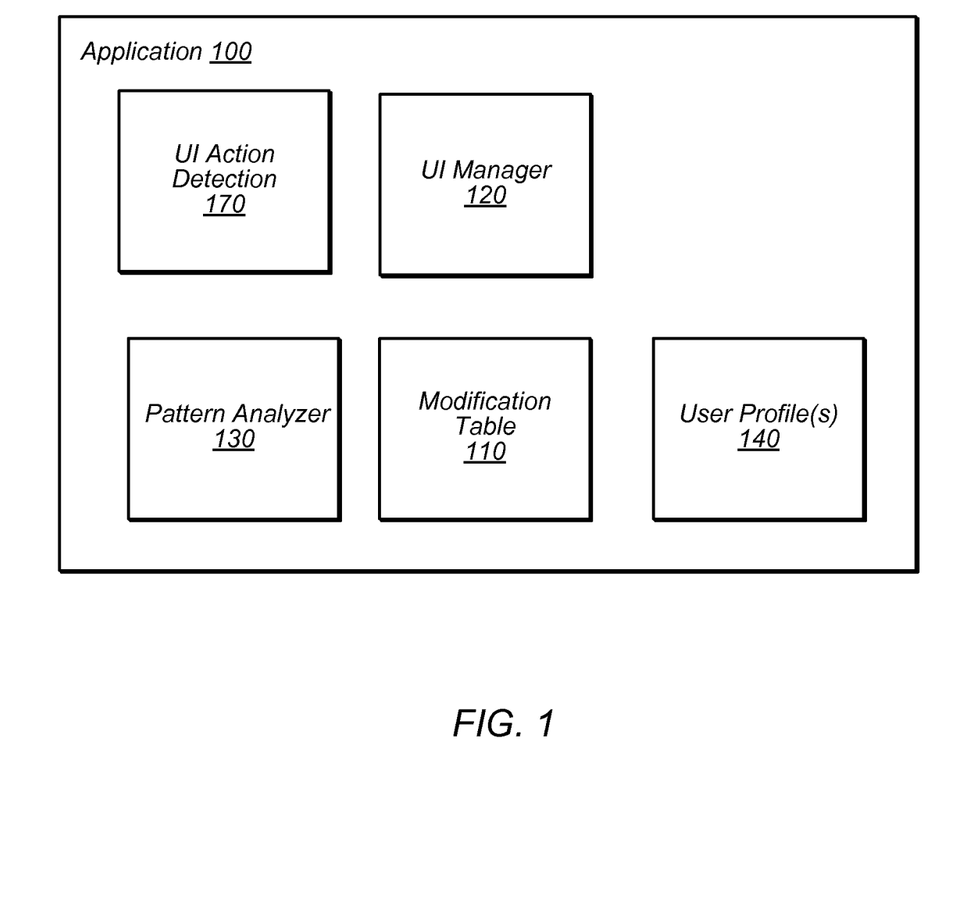
FIG. 1 illustrates an exemplary configuration that supports dynamically altering a user interface based on user interface actions, according to one embodiment.

FIG. 1 illustrates an exemplary configuration that supports dynamically altering a user interface based on user interface actions in a network-based computing environment, according to one embodiment. In general, application 100 is a program of instructions operable to receive user interface actions from the user interface coupled to the computing device. Examples of application 110 are one or more web pages viewable from a web-based browser, a word processing application, an "app" (e.g., game or other tool available on mobile devices), operating system (OS), and/or an image processing application. A user interface (UI) action received at the user interface may be, for example, a user clicking a mouse, a user touching a screen, a movement of the device, and/or a user pressing a key on a keyboard. In some embodiments, a user interface (UI) action may select features or options of the application. For example, Ctrl-z may select an undo option, a swipe on a screen may scroll within the view of the application or a mouse click may select a menu option. In other embodiments, a user interface action may be a composite of one or more user interface actions. For example, the "crop" feature of an application may include selecting the object to crop, selecting the "crop" feature and indicating the area to crop. UI action detection 170 captures one or more user interface (UI) actions. The UI actions are analyzed by pattern analyzer 130 to determine a usage pattern for a given user. UI manager 120 determines a modification from modification table 110 based on the usage pattern and dynamically implements the modification in the user interface. The modification is stored in a user profile 140 for subsequent use.

In some embodiments, application 100 may be software and/or program configured receive user interface actions. Examples of application 110 are a web-based browser configured to display web pages, an image processing application, a word processing application, a calendar tool, a mail tool, an operating system (OS), and/or entertainment "app" (e.g., "apps" for mobile devices). Application 110, in some embodiments, includes content that responds to user interface actions (e.g., interactive content), such as web pages, games, videos, etc.

In some embodiments, UI action detection 170 is configured to receive user interface actions during execution of application 100. In some embodiments, UI action detection 170 is installed as a plug-in or embedded within application 100. UI detection 170 may receive user interface (UI) actions such as a one or more single mouse clicks, a double mouse click, a mouse over, a mouse drag, a screen touch, a screen pinch, a scroll, a key press, key combinations, swipes, zooms, rotations, general movement or free-form gestures (e.g., Kinect™ movement events), and/or voice activation, for example. In some embodiments, each UI action detected by UI action detection 170 causes a corresponding response within application 100. In some embodiments, UI action detection detects the UI action, the component (e.g., mouse, screen touch, etc) that caused the UI action and the timestamp of the UI action. In some embodiments, UI action detection 170 transmits the received user interface actions to pattern analyzer 130.

In some embodiments, pattern analyzer 130 receives a plurality of user interface (UI) actions from UI action detection 170. Pattern analyzer 130 parses the plurality of UI actions into one or more sequences of user interface actions to determine usage patterns for a given user. Examples of sequences of actions may be, but are not limited to, setting a tablet on a table, increasing font size via a keystroke and/or one or more UI actions to execute a feature of an application. For example, executing a cut and paste feature of an application includes selecting the object via mouse click, executing cut via a keystroke and executing the paste via a mouse click. As another example, the sequence of actions may be selecting the login screen via a screen touch, entering text via a screen touch and selecting "enter" via a screen touch. In some embodiments, pattern analyzer 130 determines if a given sequence of user interface actions indicates a usage pattern for a particular user. If pattern analyzer 130 determines a usage pattern, then the usage pattern is transmitted to the UI manager 120.

In some embodiments, UI manager 120 receives a usage pattern from pattern analyzer 130. UI manager 120 determines a modification corresponding to the usage pattern by lookup of the usage pattern in modification table 110. The modification indicated in modification table 110 is implemented by UI manager 120 in the user interface for the given user of application 100. In some embodiments, UI manager 120 stores the modification in user profile 140 for subsequent use. For example, if a usage pattern indicates that a user exclusively uses keystrokes for a given command, the modification may be to remove the given command from the tool bar. Removing the given command from the tool bar optimizes the viewing space for the tool bar items the user accesses.

In some embodiments, user profile 140 stores modification information determined during one or more sessions of application 100. For a given application 100, there are one or more user profile(s) 140 in application 100. In some embodiments, pattern analyzer 130 identifies a user via UI actions received from UI action detection 170. UI manager 120 receives indication from pattern analyzer 130 indicating the identity of the user and UI manager 120 implements the previously determined modifications stored in user profile 130 corresponding to the particular user in the user interface of application 100. In some embodiments, the customization of the user interface for the application based on modifications stored in the user profile is implemented without identifying the user if there is only one profile associated with the particular application.

In some embodiments, modification table 110 stores one or more usage patterns and a corresponding modification. A usage pattern is a single user interface (UI) action (e.g., the angle of tablet and/or smart phone during use of the application), in some embodiments. A usage pattern is a sequence of UI actions, in some embodiments. For example, the "cut and paste function" or "crop" function described above. A usage pattern may include both a single user interface action and a sequence of user interface action. For example, the "cut and paste function" and/or "crop" function described above may be followed by "undo". Modification table 110 may store modifications indicating UI manager 120 to implement pop-up screens offering tips for executing the particular feature in response to "undo" following the "cut and paste" and/or "crop" feature, for example.

As an example, UI action detection 170 may receive login information for a given user via UI actions such as keystrokes. Pattern analyzer 130 indicates to UI manager 120 that a particular user has logged in (e.g., usage pattern) based on the sequence of UI actions. UI manager 120 accesses the pre-determined modifications stored in user profile 140 in the user interface of application 100 for the identified user. The user interface is customized with the pre-determined modifications stored in user profile 140 corresponding to the identified user.

As another example, pattern analyzer 130 receives a sequence of UI actions from UI action detection 170. Pattern analyzer 130 determines a match to a portion of the sequence of UI actions such as consistently zooming in on content and transmits indication of a usage pattern (e.g., the zoom setting) to UI manager 120. UI manager 120 accesses modification table 110 to determine a modification to set the zoom to the consistently used setting to customize the user interface of application 100. The modification is stored in user profile 140 for subsequent use.

As another example, a given application 100 such as an image processing tool may have a new release with new features. When a given user views the new release of the application, user profile 140 for the given user may indicate based on previously determined usage patterns that the given user is an expert user. Based on the modifications stored in the respective user profile, a modification to present the advanced features may be determined. In addition, a modification may be determined to invoke a tutorial screen offering step-by-step guidance through the new feature when the user accesses the new feature (e.g., as indicated by a UI action).

As another example, when a given user views a browser window on a computing device, the user may increase the font, remove scroll bars and/or change the window size each time. These UI actions captured from several views of the browser by the given user is stored in the pattern analyzer. Based on repeat occurrences of the usage pattern, the modifications may be stored in the user profile and automatically implemented at the next use of the browser.

Figure 2:
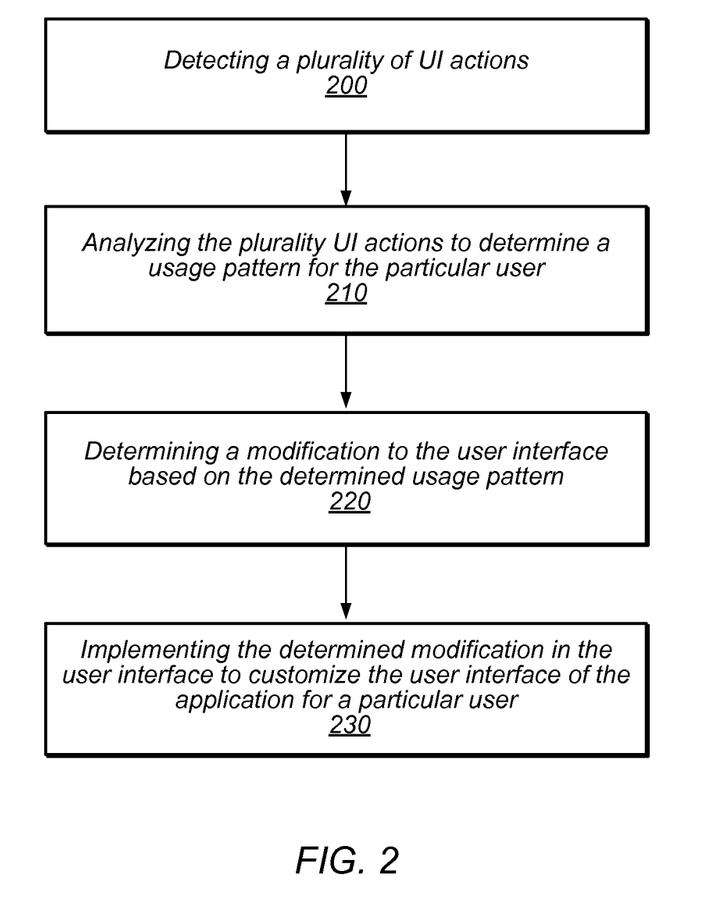
FIG. 2 is a flowchart of an exemplary method that supports dynamically altering a user interface based on user interface actions, according to one embodiment.

FIG. 2 is a flowchart of an exemplary method that supports dynamically altering a user interface based on user interface actions, according to one embodiment. As discussed above, an application (e.g., application 100 in FIG. 1) detects UI actions (e.g., by UI action detection 170 in FIG. 1). The sequence of UI actions is analyzed (e.g., by pattern analyzer 130 in FIG. 1) to determine usage patterns for a given user. In response to determining a usage pattern, a modification is determined (e.g., by UI manager 120). The modification indicated (e.g., in modification table 110) is implemented (e.g., by UI manager 120) in the user interface of an application (e.g., application 100 in FIG. 1) for a given user. The modification is stored in a user profile (e.g., user profile in FIG. 1) for subsequent use.

As indicated in 200, in some embodiments, a plurality of UI action are detected. As discussed above, UI actions may be a keystroke, a mouse click, a screen touch, voice activation and/or movement, for example. As discussed above, the UI actions cause a corresponding effect in the application. During a session of an application (e.g., application 100 in FIG. 1), a user may execute a plurality of UI actions. The plurality of UI actions are detected in the user interface (e.g., by UI action detection 170 in FIG. 1).

As indicated in 210, in some embodiments, the plurality of UI actions are analyzed to determine a usage pattern for the particular user. The detected UI actions (e.g., detected by UI action detection 170 in FIG. 1) are received as a sequence of UI actions. The sequence of UI actions is analyzed to determine a usage pattern (e.g., by pattern analyzer 130 in FIG. 1). A usage pattern is indicated by repeat occurrences of UI actions, in some embodiments. A usage pattern may be multiple occurrences of a single UI action. For example, a pinch to zoom in on a view of an application (e.g., application 110 in FIG. 1). A usage pattern may be multiple occurrences of a particular sequence of UI events. For example, creating and sending an email encompasses initiating the message, entering text and sending the message. As usage pattern may be a combination of multiple usage patterns. For example, the "crop" feature described above may be followed by undo. Execution of the "crop" feature may be one usage pattern and the other usage pattern is "undo". This will be discussed in more detail below.

As indicated in 220, in some embodiments, a modification to the user interface is determined based on the determined usage pattern. As discussed above, the sequence of UI actions are analyzed to determine usage patterns (e.g., by pattern analyzer 130 in FIG. 1). The usage pattern is used to determine a modification (e.g., in modification table 110 in FIG. 1). The modifications may be stored in a table, list or database with corresponding pre-determined usage patterns, for example. The modification is determined by look up of the usage pattern (e.g., received from pattern analyzer 130). To continue the example above, if the usage pattern is pinching to zoom in on a view of an application, the modification may be to set the zoom as the default view for the user (e.g., in user profile 140 in FIG. 1).

As indicated in 230, in some embodiments, the determined modification is implemented to customize the user interface of the application for a particular user. The modification determined above, is implemented in the user interface of an application (e.g., by UI manager 120 in FIG. 1) for the user of the application (e.g., application 100 in FIG. 1).

As an example, an application may be released with new features. UI actions corresponding to the new features may be detected. The sequence of UI actions may indicate that a particular user is unfamiliar with the new features. The sequence of actions may include several accesses to undo, accesses to help window, or deleting the content associated with the feature. Based in the usage pattern (e.g., novice user of feature), a modification is determined. Based on the determination, modifications may be implemented in the user interface. For example, as described above, the modification may be to display informational pop-ups to show the user how to operate the new feature.

As another example, a game application (e.g., application 10 in FIG. 1) for a mobile computing device may capture all user interface (UI) actions (e.g., by UI action detection 170 in FIG. 1) during a session of the game application. UI actions for a game application on a mobile computing device may be swipes, drag/drop motions, one or more taps, pinches and/or reverse pinches. An example game may be a game involving moving objects from one destination to another. Based on the information captured from UI actions, the usage pattern may indicate that the user taps multiple times to affect a single object in the game. This may indicate a modification to increase the area of the screen that accepts the taps for the respective user. The modifications (e.g., UI manager 120 in FIG. 1) may be implemented at the user interface to customize the screen area as a larger size for receiving taps for the given user.

Figure 3:
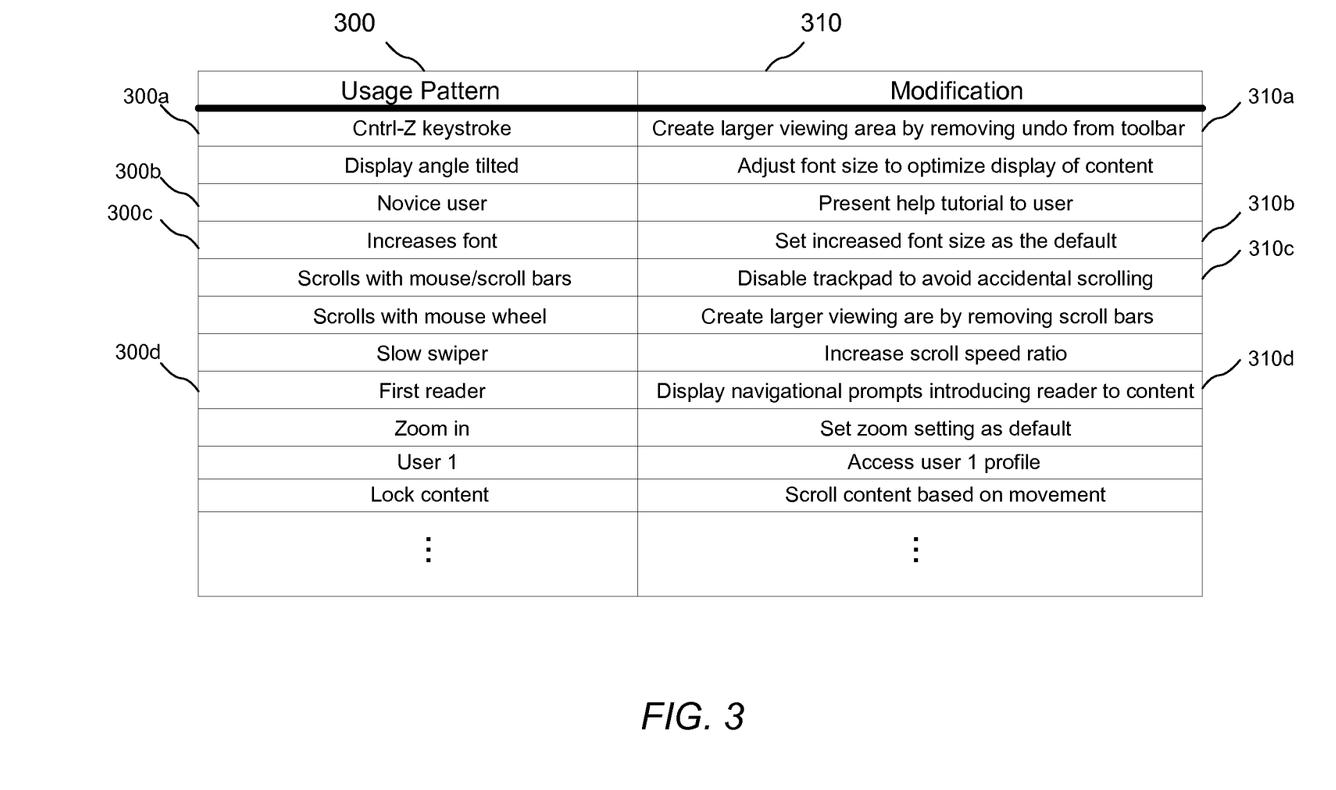
FIG. 3 depicts an exemplary table for determining a modification to implement in a user interface, according to one embodiment.

FIG. 3 depicts an exemplary table for determining a modification to implement in a user interface, according to one embodiment. As discussed above, in response to determining a match for a usage pattern (e.g., by pattern analyzer 130 in FIG. 1), a modification is determined (e.g., by UI manager 120). The modification may be determined by looking up the usage pattern in a table to determine the corresponding modification. The modifications and usage patterns are pre-determined and stored with the application (e.g., application 100 in FIG. 1). In some embodiments the modification and usage patterns can be changed in subsequent releases of the application (e.g., application 100 in FIG. 1).

Usage pattern 300 is a pre-determined list of usage patterns released with the application (e.g., application 100 in FIG. 1). As discussed above, in response to receiving indication (e.g., from pattern analyzer 130 in FIG. 1) that a usage pattern has been determined, a modification is determined (e.g., by UI manager 120). As discussed above, a usage pattern 300 (e.g., as determined by pattern analyzer 130 in FIG. 1) is one or more user interface (UI) actions detected at a user interface (e.g., by UI action detection 170 in FIG. 1). A usage pattern is determined by a pattern analyzer (e.g., pattern analyzer 130 in FIG. 1) and is based on repeat occurrences, in some embodiments. This will be discussed in further detail below.

As indicated in 300*a*, the usage pattern is the single UI action of a Cntrl-Z keystroke. This usage pattern may indicate that a given user almost exclusively utilizes the keystroke versus selecting an icon for the "undo" (e.g., Cntrl-Z) feature.

As indicated in 310*a*, the modification creates a larger viewing area by removing "undo" from the tool bar.

As indicated in 310*a-b*, the usage pattern is novice user and the modification is to present the help tutorial to the user. In some embodiments, a novice user may be indicated by multiple usage patterns. For example, the usage pattern may have a sequence of UI actions with long lengths of time between them. This may indicate that the user is unfamiliar with the feature accessed by the UI actions in the usage pattern. A novice user may be indicated by the undo feature of an application frequently appearing in the UI action sequence accessing the feature. In response to user patterns such as these, the modification 310*b* is to display the help tutorial.

As indicated in 300*c*, the usage pattern is increase font. For this usage pattern, the user may consistently increase the font size in the viewing area of the application (e.g., application 100 in FIG. 1). In response to this usage pattern (e.g., the UI action sequence of increasing font size), the modification is to set the font size to the default value for the user, as indicated in 310*c*.

As indicated in 300*d*, the usage pattern is first reader. A first reader usage pattern may have multiple usage patterns associated with it. For example, the usage pattern may indicate that the user with a given identity (e.g., as indicated by UI actions) has never visited a given website displaying a digital magazine. As another example, a first reader may exhibit a usage pattern including a UI sequence of actions of selecting each of the options in the display of a digital magazine. In response to these usage patterns, as indicated in 310*d*, navigational prompts introducing the reader to content are displayed in the user interface for the particular user.

Figure 4:
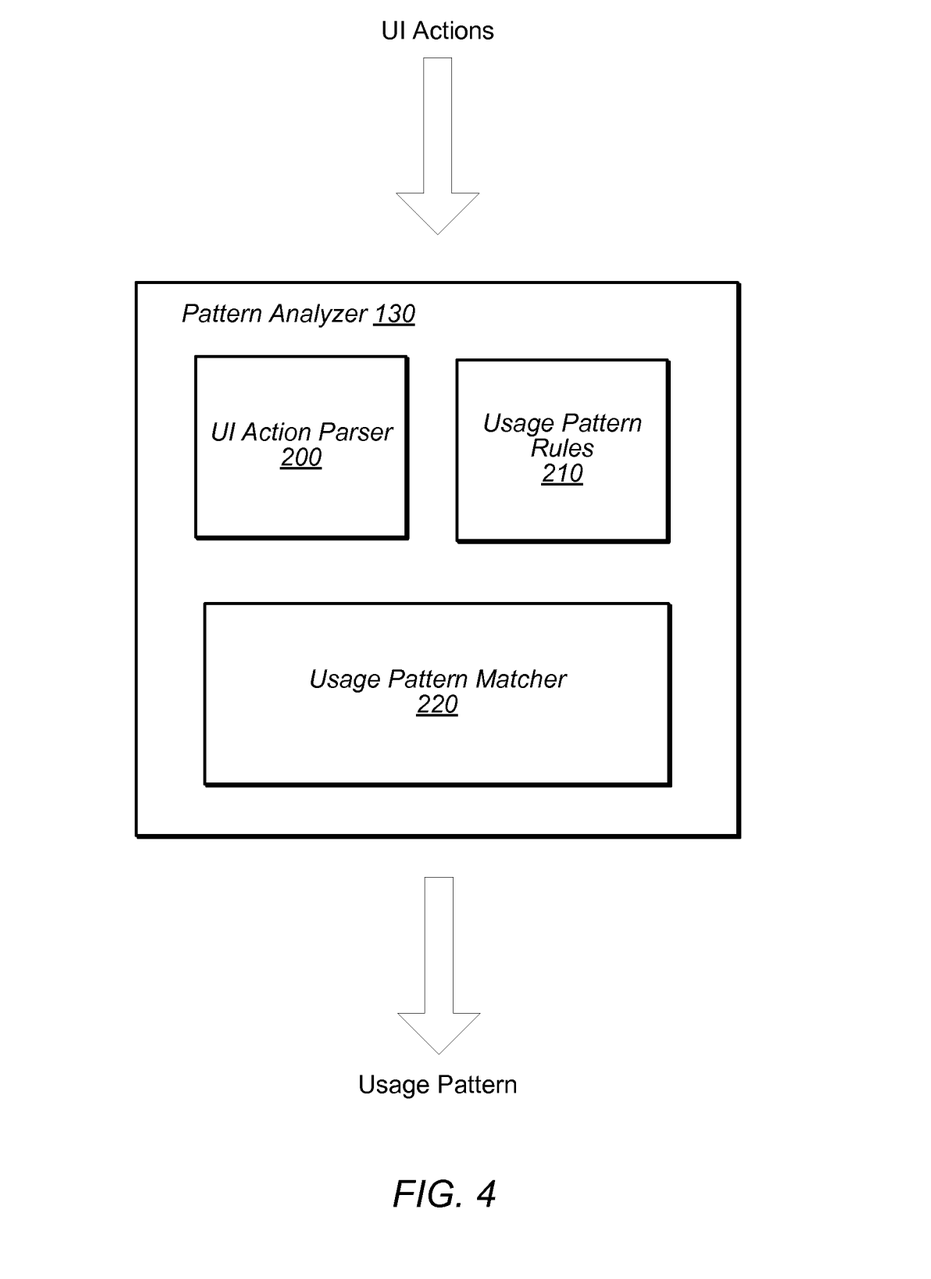
FIG. 4 illustrates an exemplary configuration for analyzing user interface (UI) actions, according to one embodiment.

FIG. 4 illustrates an exemplary configuration for analyzing user interface (UI) actions, according to one embodiment. As discussed above, UI actions are received (e.g., by UI action detection 170 in FIG. 1) in the user interface of an application (e.g., application 100 in FIG. 1). The UI actions are mouse clicks, screen touches, keystrokes, voice activation and/or movement. The sequence of UI actions is received by a pattern analyzer (e.g., pattern analyzer 130 in FIG. 1) to determine a usage pattern for a given user. A UI action parser 200 parses the sequence of UI actions, in some embodiments. Usage pattern matcher 220 determines a match based on rules from usage pattern rules 210 and repeat occurrences of the sequences of UI actions. In response to repeat occurrences of a sequence of UI actions exceeding a pre-determined threshold, pattern analyzer 130 transmits the usage pattern (e.g., to UI manager 120 in FIG. 1).

UI action parser 200, in some embodiments, receives the UI actions in the order they occurred (e.g., from UI action detection 170 in FIG. 1). UI action parser 200 parses the UI action sequence into smaller groups of sequences. The parsing may occur based on the feature set of the application (e.g., application 100 in FIG. 1), for example. The parsing of the sequence of UI actions may occur based on time stamps or some other pre-determined checkpoint, for example. In some embodiments, UI action parser 200 identifies sequences of UI actions based the usage pattern rules 210.

Usage pattern matcher 220, in some embodiments, receives the parsed UI actions from UI action parser 200. Usage pattern matcher 220 accesses usage pattern rules 210 to determine a usage pattern match. Usage pattern matcher 220 tracks repeat occurrences of a sequence of UI actions. In response to repeat occurrences of a sequence of UI actions exceeding a threshold, in some embodiments, the usage pattern is transmitted (e.g., to UI manager 170 in FIG. 1).

Usage pattern rules 210 include pre-determined usage patterns. The pre-determined usage patterns correspond to the pre-determined usage patterns stored in a modification table (e.g., modification table 110 in FIG. 1). As discussed above, usage patterns are a sequence of one or more UI actions. In some embodiments, the usage patterns may be updated, added, or removed during subsequent releases of the application.

Figure 5:
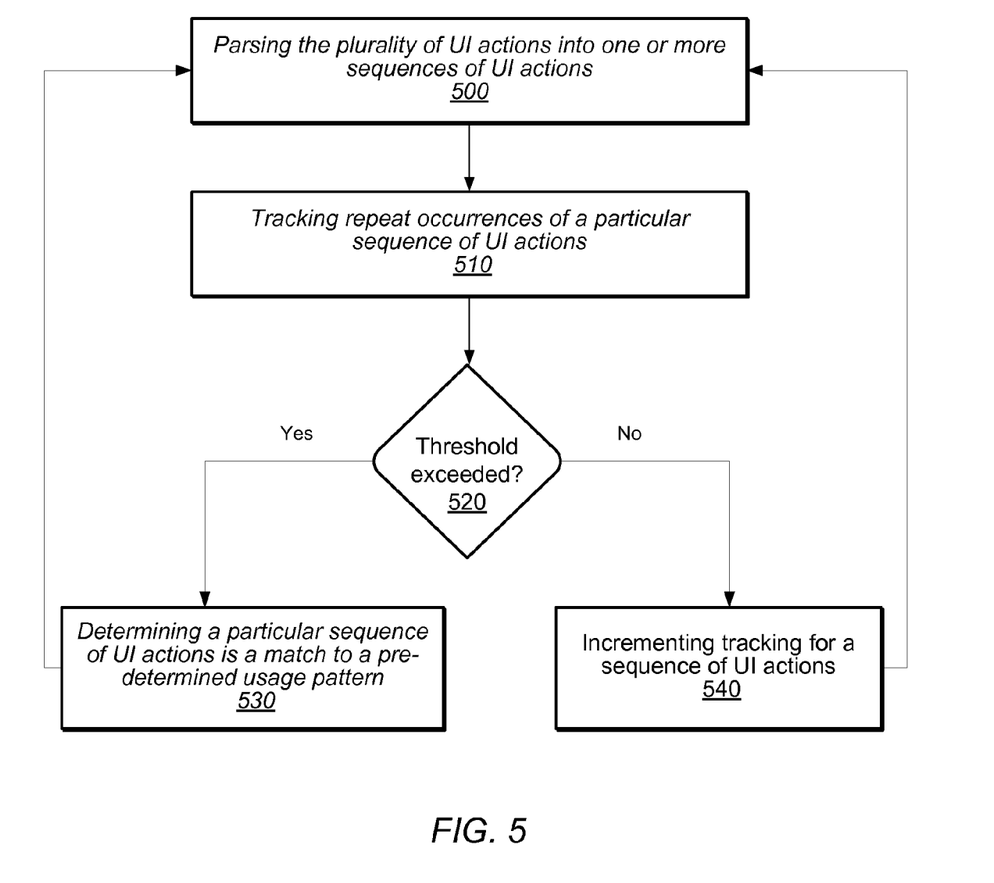
FIG. 5 is a flowchart of an exemplary method for analyzing user interface (UI) actions, according to one embodiment.

FIG. 5 is a flowchart of an exemplary method for analyzing user interface (UI) actions, according to one embodiment. As discussed above, a pattern analyzer (e.g., pattern analyzer 130) receives a sequence of UI action (e.g., in UI action parser 200 from UI action detection 170). The sequence of UI actions are parsed (e.g., in UI action parser 200 in FIG. 4) and a usage pattern matcher (e.g., usage pattern matcher 220 in FIG. 4) determines a match indicating a usage pattern. A usage pattern matcher accesses usage pattern rules (e.g., usage pattern rules 210 in FIG. 4) to determine a match. A match may be indicated by the sequence of UI action in addition to repeat occurrences of the sequence of UI actions, in some embodiments.

As indicated in 500, in some embodiments, the plurality of UI actions is parsed into one or more sequences of UI actions. As discussed above, the UI actions are received by a UI action parser in pattern analyzer (e.g., UI action parser 200 in FIG. 4). The sequence of UI actions (e.g., received from UI action detection 170 in FIG. 1) are parsed. For example, the UI action may be parsed based on the feature set of the application, time stamps of the UI actions and/or juxtaposition with another sequence of UI actions (e.g., UI actions for a feature followed by the UI action selecting the undo feature).

As indicated in 510, in some embodiments, repeat occurrences of a particular sequence of UI actions are tracked. Based on the number of occurrences of a particular sequence of UI action it is determined if a threshold has been exceeded, as indicated in 520. In some embodiments the threshold is a finite number (e.g., 20 times). In some embodiments, the threshold is a percentage (e.g., 80% of the time a user performs this sequence).

As indicated in 530, in some embodiments, a particular sequence of UI actions is determined to be a match to a pre-determined usage pattern. In response to the occurrence of a sequence of UI actions exceeding a threshold, the sequence of UI actions is determined to be a match to a pre-determined usage pattern (e.g., as indicated by usage pattern rules 210). At this point, the parsing of the plurality of UI actions continues as indicated in 500.

As indicated in 540, the tracking for a sequence of UI actions is incremented. In response to the occurrence of a sequence of UI action not exceeding a threshold, the tracking for the sequence of UI actions is incremented (e.g., in Usage pattern matcher 220 in FIG. 4). At this point, the parsing of the plurality of UI actions continues as indicated in 500.

Figure 6:
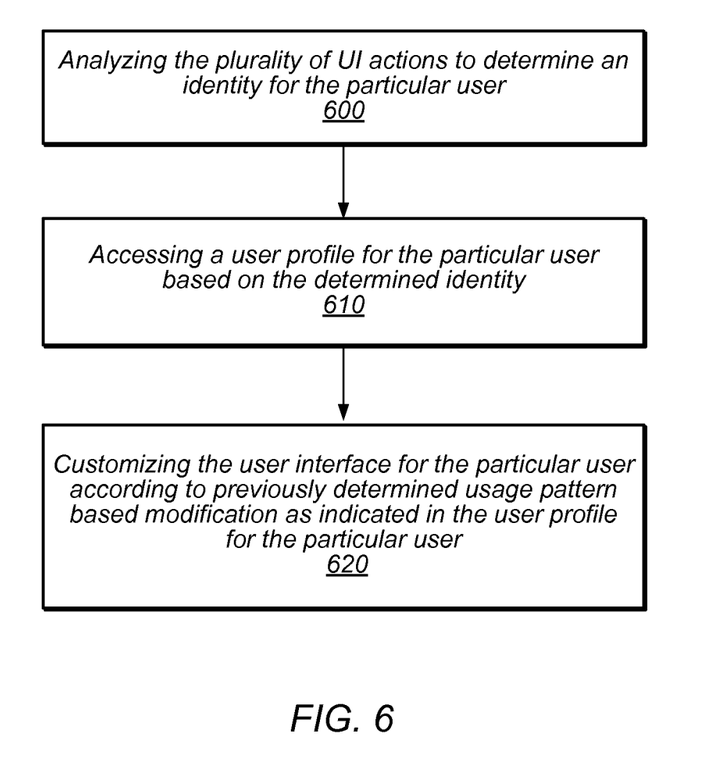
FIG. 6 is a flowchart of an exemplary method for customizing a user interface for a particular user, according to one embodiment.

FIG. 6 is a flowchart of an exemplary method for customizing a user interface for a particular user, according to one embodiment. As discussed above an application (e.g., application 100 in FIG. 1) receives UI actions (e.g., in UI action detection 170). The UI actions received may be in the form of an identifier such as a login, for example. The login may be entered via UI actions such as a touching keys on a touch screen or keystrokes of a keyboard, for example. A pattern analyzer (e.g., pattern analyzer 130 in FIG. 1) parses the sequence of UI actions (e.g., in UI action parser 200 in FIG. 4) and a usage pattern matcher (e.g., usage pattern matcher 220 in FIG. 4) determines a match based on the usage pattern rules (e.g., usage pattern rules 210 in FIG. 4). In response to identifying a user, a UI manager (e.g., UI manager 120 in FIG. 1) accesses the user profile (e.g., user profile 140 in FIG. 1) for the particular user. A UI manager implements the previously determined modifications stored in a user profile (e.g., user profile 140 in FIG. 1) based on past usage patterns in the user interface for the given user.

As indicated in 600, the plurality of UI actions is analyzed to determine an identity for the particular user. As discussed above, a plurality of UI actions are received in an application (e.g., by UI action detection 170 of application 100 in FIG. 1). The sequence of UI actions is parsed (e.g., by UI action parser 200 in pattern analyzer 130 in FIG. 4) in a pattern analyzer to determine a match. To determine the identity of a given user, a usage pattern rule (e.g., usage pattern rule 210) is defined for the particular user. For example, a sequence of UI actions such as entering a login identifier and password via keystrokes may be the usage pattern rule. In addition the usage pattern rule may not require repeat occurrences so that the appropriate modifications will be applied when the user is first identified. Once the identity is determined, an indication of the usage pattern is received by a UI manager (e.g., UI manager 120 in FIG. 1).

As indicated in 610, a user profile for the particular user is accessed based on the determined identity. As discussed above, a UI manager (e.g., UI manager 120 in FIG. 1) receives indication that a usage pattern identifying a particular user has been determined. The UI manager accesses a user profile (e.g., user profile 140 in FIG. 1) based on the usage pattern received from a pattern analyzer (e.g., pattern analyzer 130 in FIG. 4).

As indicated in 620, the user interface for the particular user is customized according to previously determined usage pattern based modifications as indicated in the user profile for the particular user. Once the UI manager (e.g., UI manager 120 in FIG. 1) has accessed the user profile (e.g., user profile 150 in FIG. 1), the modifications stored in the user profile are implemented in the user interface of the application (e.g., application 100 in FIG. 1). As discussed above, the modifications were determined during previous sessions of the application for the particular user and stored in a user profile for the particular user.

Exemplary Computer System

Figure 7:
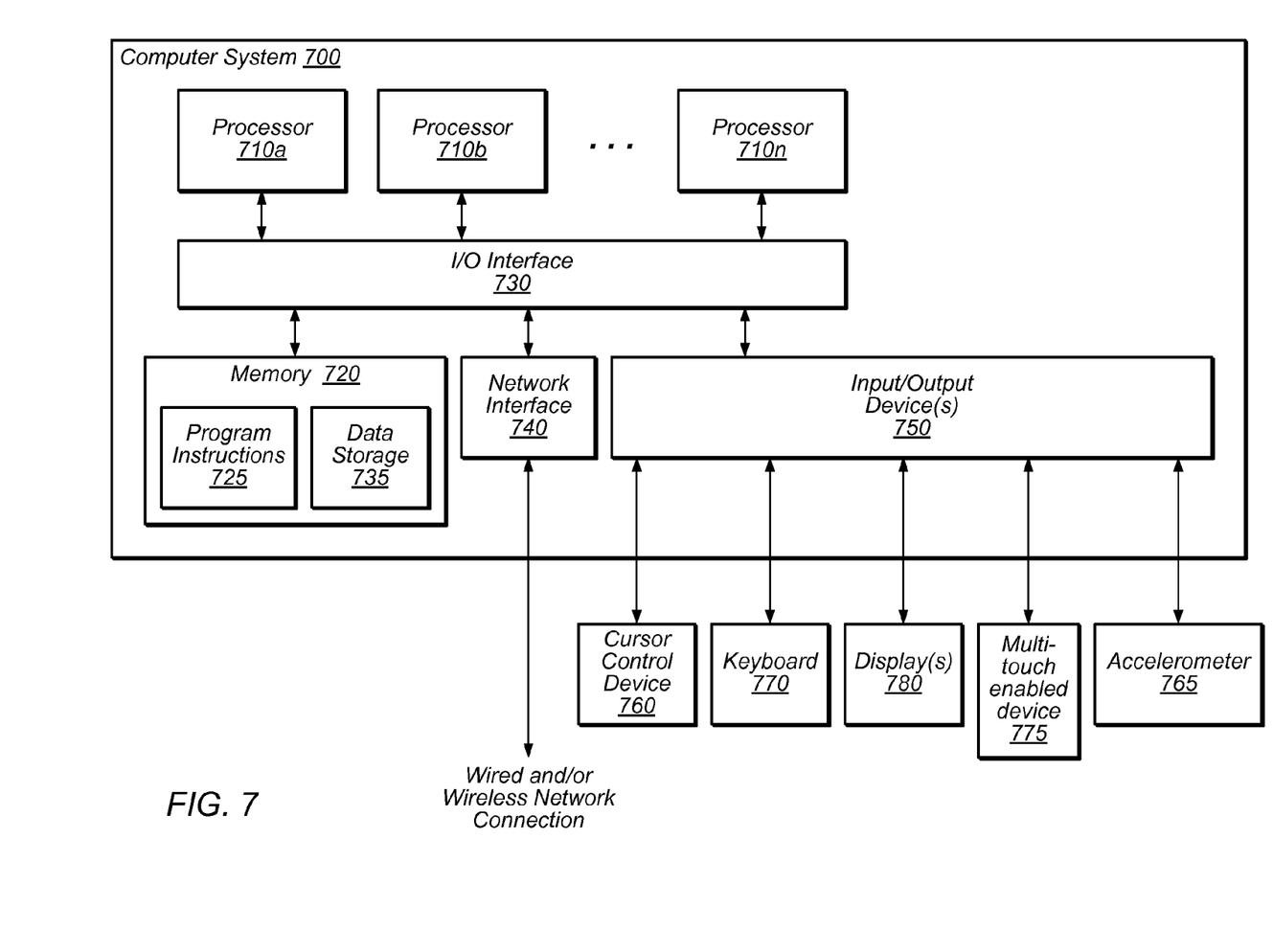
FIG. 7 illustrates an exemplary computer system for dynamically altering a user interface based on user interface actions, according to one embodiment.

FIG. 7 is a diagram that illustrates an exemplary computer system 700 in accordance with one or more embodiments of the present technique. Various portions of systems in FIGS. 1 and 4 and/or methods presented in FIGS. 2 and 5-6 and/or described herein, may be executed on one or more computer systems similar to that described herein, which may interact with various other devices of the system. For example, application 100 and its components such as pattern analyzer 130 may be executed on a processor in computing device 700.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740. Program instructions may include instructions for implementing the techniques described with respect to FIGS. 2 and 5-6.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., data collection server 160), such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, accelerometers, multi-touch screens, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Memory 720 may include program instructions 725, configured to implement embodiments of a layout-preserved text generation method as described herein, and data storage 735, comprising various data accessible by program instructions 725. In one embodiment, program instructions 725 may include software elements of a method illustrated in the above Figures. Data storage 735 may include data that may be used in embodiments described herein. In other embodiments, other or different software elements and/or data may be included.

Those skilled in the art will appreciate that computer system 700 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., parsing and analyzing sequences of UI actions) may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc. In other embodiments, program instructions implementing embodiments as described above, and/or data or results for embodiments as described above, may be provided or sent via transmission media or signals such as electrical, electromagnetic, or digital signals, conveyed via a communication medium such as network and/or a wireless link.

Various modifications and changes may be to the above technique made as would be obvious to a person skilled in the art having the benefit of this disclosure. It is intended that the invention embrace all such modifications and changes and, accordingly, the above description to be regarded in an illustrative rather than a restrictive sense. While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A method, comprising:
   performing, by one or more computing devices:
      detecting, by an application, a plurality of user interface (UI) actions from a particular user via a user interface of the application, the plurality of UI actions being associated with a previous release of the application;
      analyzing, by the application, the plurality of UI actions to determine a usage pattern for the particular user;
      determining, by the application, a modification to the user interface based on the determined usage pattern by matching the determined usage pattern to a pre-determined usage pattern linked to a pre-determined modification and setting the modification as the pre-determined modification based on the matching;
      implementing, by the application, the determined modification in the user interface to customize the user interface of the application for the particular user;
      storing, by the application, information about the modification in a user profile of the particular user, the user profile, the pre-determined usage pattern, and the pre-determined modification are stored in local storage of the application; and
      in another session of the application associated with a new release of the application:
         analyzing, by the application, one or more UI actions to determine an identity for the particular user;
         accessing, by the application, the user profile based on the determined identity; and
         customizing, by the application, the user interface of the application based on the information about the modification stored in the user profile, the customizing comprising modifying the user interface as part of the new release based on the plurality of UI actions being associated with the previous release as indicated in the user profile and providing additional information about features of the new release based on the user profile.

2. The method of claim 1, wherein said UI actions comprise a mouse click, a screen touch, a free-form movement, a touch pad event, a keystroke, or a voice command.

3. The method of claim 1, wherein said analyzing the plurality of UI actions to determine a usage pattern comprises:
   parsing the plurality of UI actions into one or more sequences of UI actions;
   determining a match between at least one of the one or more sequences of UI actions and at least one of one or more pre-determined usage patterns.

4. The method of claim 3, wherein said determining a match comprises:
   tracking repeat occurrences of a particular sequence of UI actions;
   in response to determining that a number of occurrences of the particular sequence of UI actions meets a pre-determined threshold:
      determining the particular pattern is a sequence of UI actions that matches the usage pattern.

5. The method of claim 3, wherein parsing the plurality of UI actions comprises parsing the one or more sequences of UI actions into smaller groups of sequences based on features of the application, and wherein determining the match comprises applying usage pattern rules to the smaller groups of sequences, the usage pattern rules stored in a table local to the application and comprising the one or more pre-determined usage patterns.

6. The method of claim 1, wherein said determining a modification further comprises selecting a modification corresponding to the determined usage pattern from a pre-determined store of modifications linked to usage patterns.

7. The method of claim 1, wherein said analyzing the plurality of UI actions to determine an identity for the particular user comprises comparing one or more sequences of the plurality of UI actions to one or more existing user patterns for one or more different user identities.

8. The method of claim 1, wherein matching the usage pattern comprises searching, based on the plurality of UI actions, a table storing pre-determined usage patterns and corresponding pre-determined modifications, wherein setting the modification comprises retrieving the pre-determined modification from the table and adding the pre-determined modification to the user profile, wherein the table is stored separately from the user profile in the local storage of the application.

9. The method of claim 1, wherein adding the pre-determined modification to the user profile comprises storing the pre-determined modification as part of a familiarity usage level in the user profile, wherein accessing the user profile in the other session comprises identifying the familiarity usage level based on the determined identity, and wherein customizing the user interface comprises applying stored pre-determined modifications from the familiarity level to modify the user interface.

10. The method of claim 1, further comprising:
determining the identity of the user based on the usage pattern;
accessing the user profile to check whether the modification is stored in the user profile;
applying the modification to the user interface if the user profile stores the modification; and
storing the modification in the user profile if the user profile does not store the modification for usage in the other session.

11. The method of claim 1, wherein the plurality of UI actions correspond to a format for presenting features of the application at the user interface, and wherein customizing the user interface comprises modifying the format.

12. The method of claim 1, wherein the detecting of the plurality of UI actions is performed by a plug-in implemented at the application.

13. A system, comprising:
a processor; and
a memory coupled to the processor storing a program of instructions that when executed by the processor perform:
detecting, by an application, a plurality of user interface (UI) actions from a particular user via a user interface of the application, the plurality of UI actions being associated with a previous release of the application;
analyzing, by the application, the plurality of UI actions to determine a usage pattern for the particular user;
determining, by the application, a modification to the user interface based on the determined usage pattern by matching the determined usage pattern to a pre-determined usage pattern linked to a pre-determined modification and setting the modification as the pre-determined modification based on the matching;
implementing, by the application, the determined modification in the user interface to customize the user interface of the application for the particular user;
storing, by the application, information about the modification in a user profile of the particular user, the user profile, the pre-determined usage pattern, and the pre-determined modification are stored in local storage of the application; and
in another session of the application associated with a new release of the application:
analyzing, by the application, one or more UI actions to determine an identity for the particular user;
accessing, by the application, the user profile based on the determined identity; and
customizing, by the application, the user interface of the application based on the information about the modification stored in the user profile, the customizing comprising modifying the user interface as part of the new release based on the plurality of UI actions being associated with the previous release as indicated in the user profile and providing additional information about features of the new release based on the user profile.

14. The system of claim 13, wherein the program of instructions when executed by the processor further perform said analyzing the plurality of UI actions to determine a usage pattern performs:
parsing the plurality of UI actions into one or more sequences of UI actions; and
determining a match between at least one of the one or more sequences of UI actions and at least one of one or more pre-determined usage patterns.

15. The system of claim 14, wherein the program of instructions when executed by the processor further perform said determining a match performs:
tracking repeat occurrences of a particular sequence of UI actions;
in response to determining that a number of occurrences of the particular sequence of UI actions meets a pre-determined threshold:
tracking repeat occurrences of a particular sequence of UI actions; and
in response to determining that a number of occurrences of the particular sequence of UI actions meets a pre-determined threshold:
determining the particular pattern is a sequence of UI actions that matches the usage pattern.

16. The system of claim 13, wherein the program of instructions when executed by the processor further perform said determining a modification performs selecting a modification corresponding to the determined usage pattern from a pre-determined store of modifications linked to usage patterns.

17. The system of claim 13, wherein the program of instructions when executed by the processor further perform said analyzing the plurality of UI actions to determine an identity for the particular user comprises comparing one or more sequences of the plurality of UI actions to one or more existing user patterns for one or more different user identities.

18. A non-transitory computer readable storage medium storing computer executable program instructions that when executed by a computer perform:
detecting, by an application, a plurality of user interface (UI) actions from a particular user via a user interface of the application, the plurality of UI actions being associated with a previous release of the application;
analyzing, by the application, the plurality of UI actions to determine a usage pattern for the particular user;
determining, by the application, a modification to the user interface based on the determined usage pattern by matching the determined usage pattern to a pre-determined usage pattern linked to a pre-determined modification and setting the modification as the pre-determined modification based on the matching;

implementing, by the application, the determined modification in the user interface to customize the user interface of the application for the particular user;

storing, by the application, information about the modification in a user profile of the particular user, the user profile, the pre-determined usage pattern, and the pre-determined modification are stored in local storage of the application; and in another session of the application associated with a new release of the application:

analyzing, by the application, one or more UI actions to determine an identity for the particular user;

accessing, by the application, the user profile based on the determined identity; and customizing, by the application, the user interface of the application based on the information about the modification stored in the user profile, the customizing comprising modifying the user interface as part of the new release based on the plurality of UI actions being associated with the previous release as indicated in the user profile and providing additional information about features of the new release based on the user profile.

19. The non-transitory computer readable storage medium of claim 18, wherein the program instructions when executed by a computer perform said analyzing the plurality of UI actions to determine a usage pattern further perform:

parsing the plurality of UI actions into one or more sequences of UI actions;

determining a match between at least one of the one or more sequences of UI actions and at least one of one or more pre-determined usage patterns.

20. The non-transitory computer readable storage medium of claim 19, wherein the program instructions when executed by a computer perform said determining a match further perform:

tracking repeat occurrences of a particular sequence of UI actions;

in response to determining that a number of occurrences of the particular sequence of UI actions meets a pre-determined threshold:

determining the particular sequence of UI actions matches the usage pattern.

21. The non-transitory computer readable storage medium of claim 18, wherein the program instructions when executed by a computer perform said determining a modification further performs selecting a modification corresponding to the determined usage pattern from a pre-determined store of modifications linked to usage patterns.

22. The non-transitory computer readable storage medium of claim 18, wherein the program instructions when executed by a computer perform said analyzing the plurality of UI actions to determine an identity for the particular user comprises comparing one or more sequences of the plurality of UI actions to one or more existing user patterns for one or more different user identities.

* * * * *